Oct. 22, 1968 W. G. THISTLE 3,407,291
COMPUTER FOR EVALUATING INTEGRALS USING
A STATISTICAL COMPUTING PROCESS
Filed Nov. 29, 1963 6 Sheets-Sheet 1

INVENTOR
WILLIAM G. THISTLE
BY Smart & Biggar
ATTORNEYS.

INVENTOR
WILLIAM G. THISTLE

BY Smart & Biggar
ATTORNEYS

Oct. 22, 1968 W. G. THISTLE 3,407,291
COMPUTER FOR EVALUATING INTEGRALS USING
A STATISTICAL COMPUTING PROCESS
Filed Nov. 29, 1963 6 Sheets-Sheet 3

INVENTOR
WILLIAM G. THISTLE
BY Smart & Biggar
ATTORNEYS.

INVENTOR
WILLIAM G. THISTLE
BY Smart & Biggar
ATTORNEYS.

INVENTOR
WILLIAM G. THISTLE
BY Smart & Biggar
ATTORNEYS.

INVENTOR
WILLIAM G. THISTLE
BY Smart & Biggar
ATTORNEYS.

United States Patent Office 3,407,291
Patented Oct. 22, 1968

3,407,291

COMPUTER FOR EVALUATING INTEGRALS USING A STATISTICAL COMPUTING PROCESS

William Graham Thistle, Ste. Foy, Quebec, Canada, assignor to Canadian Patents and Development Limited, Ottawa, Ontario, Canada, a body corporate Filed Nov. 29, 1963, Ser. No. 326,854
Claims priority, application Canada, Nov. 30, 1962, 863,495
22 Claims. (Cl. 235—183)

This invention relates to a computer which uses statistical methods to make computations.

Many computing applications require the real time evaluation of integrals of the form $I=\int ydx$ where $x$ and $y$ are functions of time.

This evaluation may be done by many methods, such as ordinary digital means, by analog methods such as ball and disc integrators or by electronic analogs in which the integral is expressed in the form $I=\int y.zdt$, and where $$z=\frac{dx}{dt}$$

The present invention provides a novel form of computer to perform the integration referred to above. It is simple in concept and has some of the advantages of both analog and digital methods. In addition to simple integration it can also do addition, multiplication, and division inside the integration sign. In other words, it can be used to evaluate integrals of the form $I=\int(u+vw)/ydx$, for example, without using any special purpose components. The system can be built completely with solid state electronic components and hence can be small, rugged and reliable. The computer according to the invention is not a general purpose device but may be highly useful as a navigation computer or in process control, for example.

Basically, the computer according to the present invention differs from previously used computers in its use of a statistical rather than a deterministic computing process. In essence, to evaluate the integral $I=\int ydx$, the computer comprises gating means adapted to receive the electrical analog (e.g. a series of pulses) of a series of known uniform intervals of change of the variable $\chi$, and adapted to pass the analog randomly but with a probability proportional to the absolute magnitude of the variable $y$. The computer in a preferred embodiment includes a gate adapted to pass input pulses whose frequency of occurrence is a function of the rate of change of the input variable $\chi$, and means adapted to open and close the gate thereby allowing the input pulses to pass, only during intervals of time which occur randomly but relatively frequently or infrequently in proportion to the magnitude of the input variable $y$. The means adapted to open and close the gate is preferably a gate pulse generator adapted to generate gate-opening pulses randomly with respect to the input pulses, but in a manner such that the probability of the gate being open at a given time is proportional to the value of the input variable $y$. Summing or counting means is preferably provided to record the sum of the intervals whose analog is passed by the gate. The means may be a conventional counter adapted to count electric pulses passed by the gate, increasing its total by 1 unit for each pulse received (assuming that both variables are positive). Modifications may be made, as described below, to accommodate negative variables.

The principle of operation of the computer according to the invention is based on the following mathematical discussion:

The integral $$I=\int_{x_1}^{x_2} ydx$$

may be approximated by a summation process, i.e.

$$I=\sum_{j=1}^{n} y_j\cdot\Delta x_j \quad (1)$$

where $$\sum_{j=1}^{n}\Delta x_j=\chi_2-\chi_1$$

and $y_j$ is the value of $y$ taken somewhere within the $j$th increment of $x$.

If all values of $\Delta x_j$ are equal, i.e.

$$\Delta x_j=\Delta x=(\chi_2-\chi_1)/N \quad (2)$$

the integral reduces to $$I=\Delta x\sum_{j=1}^{n} y_j$$

The summation in Equation 2 can be approximated by statistical methods. In a binary random process, if there are N trials and the probability that an event occurs at the $j$th trial is $P_j$, then the expected number of events will be $$\sum_{j=1}^{n} P_j$$

This summation resembles the summation in Equation 2 and it is easy to see that with suitable choices of the value of $P_j$ and a proper constant of proportionality, the integral can be evaluated using the summation process. The actual number of events which occur will of course be a random number, but its expected or mean value will be the desired value, and as discussed below, its deviation from this expected value can be kept within reasonable bounds.

The invention will now be described with reference to the accompanying drawings, in which.

Figure 1:
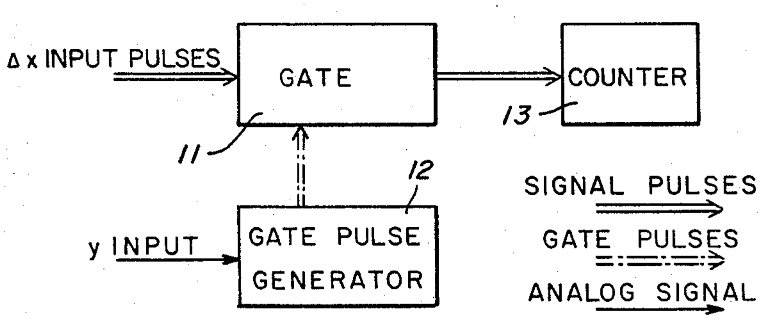
FIGURE 1 is a schematic block diagram of the basic computer according to the invention.
Figure 3:
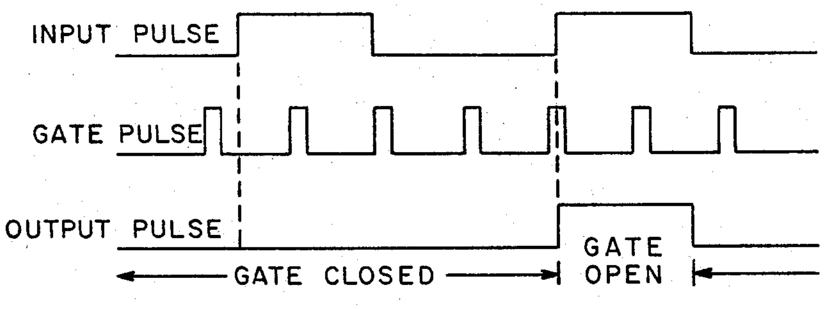
FIGURE 3 illustrates a typical sequence of input, gate, and output pulses in the computer according to the invention.

The block diagram of FIGURE 1 illustrates the basic computer according to the invention. The integral $I=\int y dx$ is approximated by the summation $\Delta x$.

$$\sum_{k=1}^{n} P_k$$

where $\Delta x$ is fed to the computer as an input pulse of constant magnitude and width, but whose frequency of occurrence is proportional to the rate of change of the variable $x$; and where $P_k$ is the probability proportional to the magnitude of the variable $y$ for the $k$th $\Delta x$ pulse; i.e. $P=K_y$, where K is a constant. Obviously K must be chosen so that the maximum expected value of $y$, when multiplied by K, is no more than 1, since probabilities in excess of 1 are impossible. In FIGURE 1, the input $\Delta x$ pulses are fed to a gate 11, which is open to any $\Delta x$ pulse only if a gate pulse produced by a gate pulse generator 12 is present when the input $\Delta x$ pulse arrives (see FIGURE 3). The gate 11 thus operates as an AND gate.

The gate pulses are generated at random (in a manner to be described in detail below with reference to FIGURES 11 and 13) with respect to the input pulses, but in such a manner that the probability, P, of the gate being open at a given time is proportional to the magnitude of the variable $y$. (This is possible only if $y$ is always positive, or always negative, since P must be within the interval $0 \leq P \leq 1$. The general case where $y$ is positive or negative is discussed below with reference to FIGURE 2.) The output pulses from the AND gate 11 are accumulated in a counter 13 for further operations, recording, or visual indication.

If the $j$th input pulse denotes the $j$th increment of $x$, then the probability of this pulse getting through the gate will be $P_j=k.y_j$. For N input pulses the mean or expected value E of the number, M, of pulses getting through the gate is $$E(M)=\sum_{j=1}^{n} P_j = K\sum_{j=1}^{n} Y_j$$

The value of the integral is therefore (referring to Equation (2)):

$$I=\frac{\Delta x \cdot E(M)}{K} \tag{3}$$

The number M accumulated in the counter 13 will not, in general, be equal to E(M), but will be a random number whose mean is E(M) and whose variance is $$\sigma m^2=\sum_{j=1}^{n}(P_j-P_j^2)$$

It can be shown that the maximum value of the standard deviation is $$\sigma m\ (\text{max.})=\sqrt{\frac{N}{2}}$$

Thus the value of the integral accumulated in the counter 13 but will not be I, but will be some value I′, where $$I'=\frac{\Delta x \cdot M}{K} \tag{4}$$

I′ will be a random number having a nearly normal distribution whose expected value is I, and whose maximum standard deviation is $$\sigma I\ (\text{max.})=\frac{\Delta x}{K}\sqrt{\frac{N}{2}}$$

Since $\Delta x=(x_2-x_1)/N$, where $(x_2-x_1)$ is the interval of $x$ over which the integral is taken, and N is the number of increments, then $$\sigma I\ (\text{max.})=\frac{1}{2K}\sqrt{\Delta x \cdot (x_2-x_1)} \tag{5}$$

Thus if the summation approximation is valid the system will compute the value of the integral as given by Equation (4) with a random error whose standard deviation will not exceed the value given by Equation (5).

As shown by Equation (5), the random errors can be reduced by reducing the size of the increment $\Delta x$. This will also improve the accuracy of the summation process. If it is not feasible to reduce the increment size below a certain level, then the random errors can be still further reduced by causing several pulses to be generated at each increment. If $n$ pulses are so generated, then the random errors will be reduced by $\sqrt{n}$. This will not, of course, improve the accuracy of the summation approximation.

Figure 2:
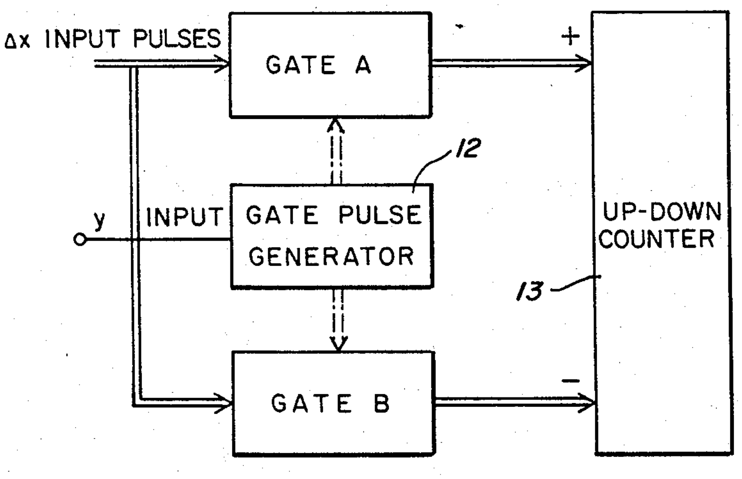
FIGURE 2 is a schematic block diagram of the computer according to FIGURE 1, with the modification that additional means is provided to permit computation when one of the input variables may be positive or negative.

The foregoing assumed that $y$ could not change sign. If $y$ can be positive or negative then two gates may be used. The system is then as shown in FIGURE 2. The gate pulse generator 12 operates in exactly the same manner as previously described, opening the two gates A and B simultaneously.

Gate A operates when $y$ is positive and its probability $P_A$ of being open is given by:

$$P_A=K.y \text{ for } y \geq 0$$
$$P_A=0 \text{ for } y<0$$

Gate B operates when $y$ is negative and its probability $P_B$ of being open is given by:

$$P_B=K.y \text{ for } y \leq 0$$
$$P_B=0 \text{ for } y>0$$

An output from gate A increments the counter 13 by 1, an output from gate B decrements the counter 13 by 1. The expected value of E of the net count M is therefore $$E(M)=\sum_{j=1}^{n}(P_{A_j}-P_{B_j})$$

Since outputs from the two gates are mutually exclusive then $$P_{A_j}-P_{B_j}=K \cdot Y_j$$

Thus $$E(M)=K\sum_{j=1}^{n} Y_j$$

as before, and $$\sigma m^2\ (\text{max.})$$

can be shown to be $N/4$ as before.

The usefulness of the computer constructed according to the invention is best illustrated by an example. In a dead-reckoning computer, the distance $s_A$ travelled along a reference direction is given by $s_A=\int \cos \theta ds$, where s is the distance travelled on a plane surface and $\theta$ is the angle between the direction of motion and the reference axis in the plane. The distance $S_R$ travelled at right angles to the reference axis is given by $S_R=\int \sin \theta ds$.

Either of these integrals, for example the integral $S_R=\int \cos \theta ds$, can be implemented using the computer shown in FIGURE 2, where the input $y=\cos \theta$ and the increment $\Delta x=\Delta s$. An input pulse is generated at each increment $\Delta s$ of distance travelled. This pulse could be generated, for example, at each turn of the speedometer cable of a land vehicle. Cos $\theta$ is represented by an analog voltage developed from any known form of resolver on a conventional reference direction indicator. The gate pulse generator 12 develops pulses to operate gates A and B so that the probability $P_A$ of gate A being open at any instant is given by:

$$P_A=\cos \theta \text{ for } \cos \theta \geq 0$$
$$P_A=0 \text{ for } \cos \theta<0$$

and similarly $$P_B=-\cos \theta \text{ for } \leq 0$$
$$P_B=0 \text{ for } \cos \theta>0$$

Each pulse from gate A represents one increment of distance up the reference axis, and increments the counter 13 by 1. Each pulse from gate B represents one increment down the reference axis and decrements the counter 13 by 1. The number held in the counter therefore represents the initial setting plus the net distance travelled up the reference axis.

An identical circuit will compute the distance at right angles to the reference axis if sin $\theta$ is substituted for cos $\theta$ as the analog input. The two counters then in effect continuously display two co-ordinates indicating position on the plane surface.

A number of errors in computation may occur in computers according, to the present invention. First, non-ideal behaviour of circuit components can cause errors. These are determined by the actual circuit design and can usually be reduced to acceptable levels using known methods, by persons skilled in the art.

Two other types of error are introduced. The first is in the summation approximation to the integral. In general the upper bound placed on the value of the incremental $\Delta x$ pulse is determined by the manner in which the other variable, $y$, varies with $x$. The approximation will be good if $\Delta x$ is too small to allow $y$ to vary appreciably within that increment.

The other type of error is the random error discussed previously (see e.g. Equation 5). Using the example of the dead-reckoning computer, if the vehicle travels a total distance of 10,000 feet and a distance increment of one foot is used, then the maximum value of the standard deviation of the computing error will be 50 feet. The actual standard deviation will of course depend on the path travelled and can be anywhere from zero to this maximum value. Since the absolute error increases as the root of the distance travelled, the relative error decreases as the root of the distance travelled. This is to be expected since a random process becomes more predictable as the number of events increases.

Figure 4:
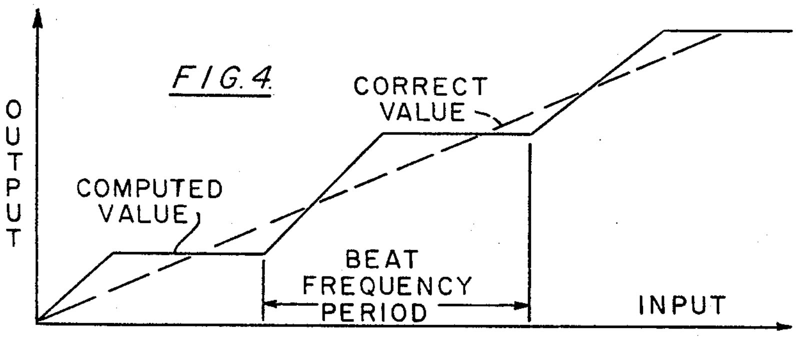
FIGURE 4 is a graph illustrating a comparison of computed and theoretical integral values for constant gate width and fixed gate and pulse frequencies.

The foregoing discussion has assumed that the operation of the plate is random with respect to input pulse operation. This does not necessarily imply that the gate must be random with respect to time. In fact in many applications there will be sufficient variation in the frequency of the input pulses to permit random operation of the gate even though the gate itself operates at fixed frequency. If gate and input pulses both arrived at a fixed rate, then provided there is no simple harmonic relation between the two frequencies, they will give a beat frequency. It can be shown that, if averaged over a complete cycle of the lowest beat frequency of the pulse and gate frequencies, the performance of the computer will be correct. The output for a fixed gate width will be roughly as shown in FIGURE 4.

Where possible the gate should be operated at a much higher frequency than the frequency of occurrence of input pulses. In this case the lowest beat frequencies will occur between the fundamental of the gate frequency and a high harmonic of the pulse frequency. The input pulse rate would then have to be extremely stable to produce a sustained stable beat frequency, and this would be very unlikely in most applications. If it were possible in any application that such periods of stable input pulse frequencies could occur, then the input pulses should be time-displaced in a random fashion over a time period greater than one period of the gate pulse. This would satisfy the conditions for random gate occurrences.

Since the gate pulses can occur at a fixed frequency their generation is quite simple. All that is required is that the pulse width, expressed as a fraction of the total period, be equal to the probability required.

The gating itself must be done carefully. Any circuit delays which tend to add to the effective gating period will of course cause consistent errors. In the navigational computer described with reference to FIGURE 2, the gating is effectively done on the leading edge of the input pulse. If the gate pulse is "on" when the leading edge of the input pulse arrives, the input pulse is passed through unchanged. If the gate pulse is "off" at the arrival of the input pulse, the gate remains off for the duration of the input pulse, which thus fails to actuate the counter. This operation is illustrated in the diagram in FIGURE 3.

The present invention may be used not only for the evaluation of integrals in the form $I=\int u.vdz$ which may for integrals of a more complex nature requiring computation within the integral sign. Again the inventive idea of expressing the value of a variable by the probability of occurrence of a pulse, as was done in the computing system so far described, opens the possibility for additional computing of variables by using and combining properties of random events.

The method of gating on the leading edge of the input pulse is only one of several possible gating methods. For example, one could also gate the trailing edge. The gating should in any case be effected during a short interval.

Figure 5:
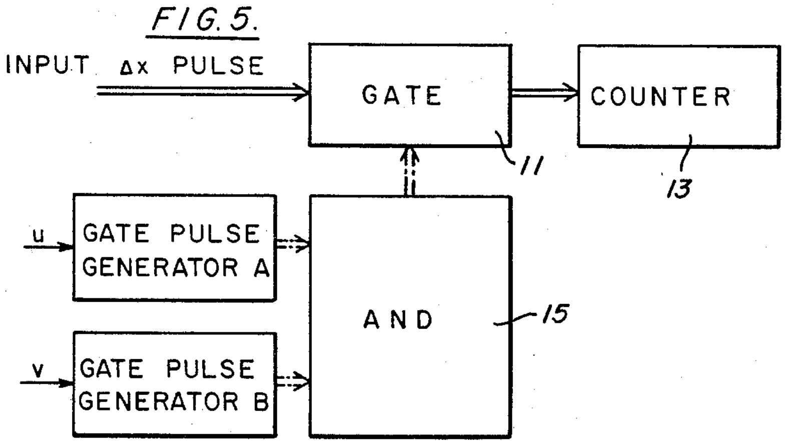
FIGURE 5 is a schematic diagram of a computer constructed according to the invention and capable of performing multiplication.

*Multiplication.*—Two variables can be multiplied by combining their respective gate pulses in an AND gate 15, as illustrated in FIGURE 5. This makes possible the evaluation of integrals in the form $I=\int u.vdx$ which may be approximated by the expression $$\frac{\Delta x}{k_1 k_2} \sum_{j=1}^{n} u_j \cdot v_j$$

where $P_A=K_1.u$ and $P_B=K_2v$, and $P_A$ is the probability that an "on" voltage will be present from gate pulse generator A, and $P_B$ is the similar probability for generator B. If these probabilities are statistically independent, then the voltage from the AND gate 15 will have a probability of $P_A.P_B$ of being "on." Then, since $P_A=K_1.u$, and $P_B=K_2.v$, the expected value of M in FIGURE 5 is $$E(M)=\sum_{j=1}^{n} P_{A_j} \cdot P_{B_j}$$

hence the system can be used to compute $I=\int u.vdx$.

Figure 6:
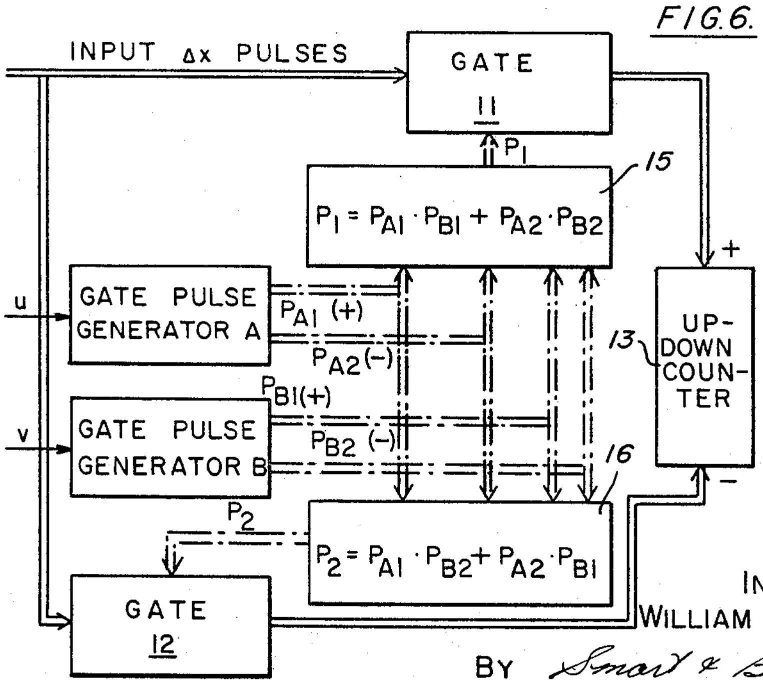
FIGURE 6 is a schematic diagram of a computer which is an improvement on the computer illustrated in FIGURE 5.

In the above discussion, it was assumed that $u$ and $v$ do not change sign. FIGURE 6 shows the same system when $u$ and $v$ can both have positive and negative values. If $u$ is positive, a gate pulse having a width corresponding to the probability $P_{A1}$ proportional to $u$ is produced by the gate pulse generator A. If $u$ is negative, a pulse having a width corresponding to the probability $P_{A2}$, proportional to $|u|$ is produced. Likewise the gate pulse generator B produces a pulse corresponding to $P_{B1}$, proportional to $v$, if $v$ is positive, and a pulse having a width corresponding to $P_{B2}$, proportional to $|v|$, if $v$ is negative. The gates 15 and 16 combine the pulses so that the gate 15 produces a pulse having a width corresponding to a probability $P_1$, where $P_1$ is the sum of the two products $P_{A1}.P_{B1}$ and $P_{A2}.P_{B2}$ while the gate 16 produces a pulse having a width corresponding to a probability $P_2$ where $P_2$ is the sum $P_{A1}.P_{B2}+P_{A2}.P_{B1}$. The input $\Delta x$ pulse is fed to two gates 11 and 12 which receive the outputs corresponding to $P_1$ and $P_2$ of gates 15 and 16 and respectively. The simultaneous presence of an output pulse having a width corresponding to $P_1$, and the leading edge of a $\Delta x$ pulse, causes the up-down counter 13 to increase its accumulated total by 1 unit; while the simultaneous presence of an output pulse having a width corresponding to $P_2$, and the leading edge of a $\Delta x$ pulse, causes the counter 13 to decrease its total by 1.

As an example of the operation of the circuit of FIGURE 6, consider the case in which $u$ is negative and $v$ is positive. The gate pulse generator A will then produce a $P_{A2}$ pulse, and the generator B a $P_{B1}$ pulse. The products $P_{A1}.P_{B1}$, $P_{A2}.P_{B2}$, and $P_{A1}.P_{B2}$ will all be zero, since at least one term in each of the products does not exist. The only remaining product, $P_{A2}.P_{B1}$, results in the production of a $P_2$ pulse, decrementing the counter 13 if the $P_2$ pulse coincides with the leading edge of an input $\Delta x$ pulse.

The means of multiplication shown in FIGURES 5 and 6 assumes statistical independence of the gate pulses representing the two variables. As discussed previously, if the two gate pulses are at fixed frequencies, the method can be shown to be correct if averaged over the beat frequency of the two gates. Also, the value of the product is only of importance at the arrival of an input pulse, which is effectively a random occurrence. Hence the requirement for random generation is satisfied if the average value of the output of the AND gate 11 is correct, and if any cyclic variation in the value of the output is not correlated with the arrival of input pulses. If this condition is not obtained, then one or both of the gate pulse generators can be made to operate at a random frequencies, although this will complicate the pulse generation.

Addition

Figure 7:
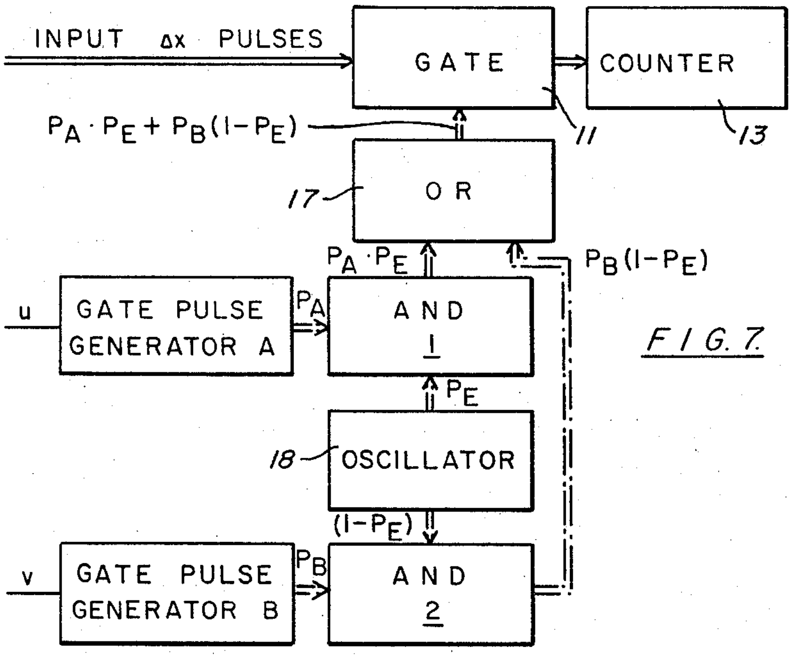
FIGURE 7 is a schematic diagram of a computer according to the invention which is capable of performing addition.

If A and B are mutually exclusive events with probabilities of occurrence $P_A$ and $P_B$, then the probability of occurrence of A or B is $P_A+P_B$. Therefore, two variables can be added by combining their corresponding gate pulses in an OR gate, provided the two pulses are mutually exclusive. FIGURE 7 shows a means of evaluating the integral $$I=\int(a.u+b.u)dx$$

The two AND gates 1 and 2 are used to make the pulses from gate pulse generators A and B mutually exclusive. The gates are driven by an oscillator 18 so that when the gate 1 is "on" the gate 2 is "off" and vice versa. The AND gate 1 is "on" for a fraction $P_E$ of the time and the AND gate 2 for a fraction $(1-P_E)$ of the time. The outputs of these two gates are then mutually exclusive. The outputs of the two AND gates are combined in the OR gate 17 whose output is therefore $P_A.P_E+P_B(1-P_E)$. The gate 11 accepts the OR gate output and the $\Delta x$ input in the manner hereinbefore described thereby to effect integration by approximating the integral by a value M accumulated in the counter 13. The expected value of M is $$E(M)=\sum_{j=1}^{n}(P_{A_j}\cdot P_{E_j}+P_{B_j}(1-P_{E_j}))$$

$$=K_1\cdot P_E\sum_{j=1}^{n}u_j+K_2(1-P_E)\sum_{j=1}^{n}v_j$$

By choosing appropriate values for $K_1$, $K_2$ and $P_E$, one can then approximate the integral $I=\int(a.u+b.v)dx$.

If $u$ and $v$ are represented by analog voltages, it is simpler to add them in that form. However, if $u$ or $v$ is the product of two other variables, then analog addition is not possible and the above method can be used, in conjunction with the multiplication method described above.

If $u$ and $v$ are permitted to change sign, suitable circuit alterations as exemplified in FIGURE 2 may be made. Such alterations would be obvious to those skilled in the art.

Division

Figure 8:
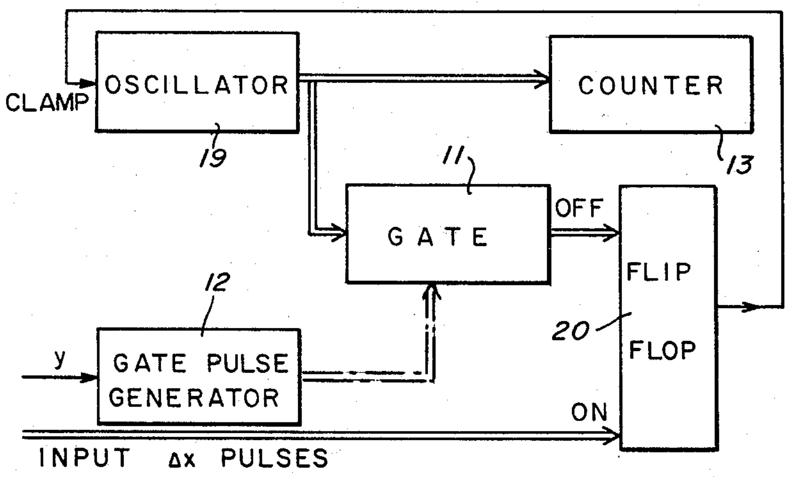
FIGURE 8 is a schematic diagram of a computer according to the invention which is capable of performing division.

Division can be obtained by placing the gate 11 of FIGURE 1 in a feedback loop as shown in FIGURE 8. In FIGURE 8, reference numeral 20 indicates a flip-flop which is turned on by an input $\Delta x$ pulse and is turned off by a pulse from the gate 11. The flip-flop 20 controls an oscillator 19 so that output pulses are generated by the oscillator when the flip-flop 20 is on. These output pulses are also applied to the gate input.

The operation of the circuit of FIGURE 8 is then as follows: When an input $\Delta x$ pulse arrives, the flip-flop 20 is turned on. This actuates and clamps the oscillator 19 which generates output pulses until the leading edge of one of these pulses coincides with a gate pulse produced by the gate pulse generator 12. Thus oscillator output pulse gets through the gate 11 and turns off the flip-flop, which remains off until the next input pulse. Thus the number of output pulses will depend inversely on the probability P of a pulse getting through the gate. Since the gate pulse generator 12 produces pulses at a constant frequency with a pulse width proportional to $y$, as previously described, the integral $$\int\frac{1}{y}dx$$

is therefore approximated.

In common with all methods of division this system will have large errors when the divisor, in this case P, is small.

It can be shown that the maximum value of the relative truncation error (caused by the departure of the system from the assumption that the flip-flop is always turned off before the next input pulse arrives) is given by $$[E/E(M)]_{max}=(1-P_{min})R_{max}$$

where $P_{min}$ is the minimum value of P, and $R_{max}$ is the maximum number of oscillator pulses which may be generated between successive input pulses, at the minimum input pulse separation. The minimum allowed oscillator frequency will therefore depend on the accuracy required, the maximum value of input pulse frequency, and the minimum expected value of $P_j$.

As an example, suppose that a maximum variation of 2:1 is expected in the value of $y$, and that the error must be kept below 0.1%, i.e. $(1-P_{min})R_{max}\leq10^{-3}$. By proper choice of K the value of $P_j$ can be restricted to the range $0.5\leq P_j\leq1$, i.e. $P_{min}=0.5$. Therefore $$(0.5)R_{max}\leq10^{-3},\text{ and }R_{max}\geq10.$$

This means that the oscillator frequency for this case must be at least ten times the maximum input pulse rate to ensure the required accuracy under all conditions.

In addition to the truncation error described above there will be a random error, which will be maximum when $p=P_{min}$, i.e.

$$\sigma m^2\text{ (max.)}=\frac{N(1-P_{min.})}{P_{min.}^2}$$

and $$\sigma_m\text{ (max.)}=\frac{\sqrt{N(1-P_{min.})}}{P_{min.}}$$

At this value of P the relative error will be $$\frac{\sigma m}{E(M)}=\sqrt{\frac{(1-P_{min.})}{N}}$$

Figure 9:
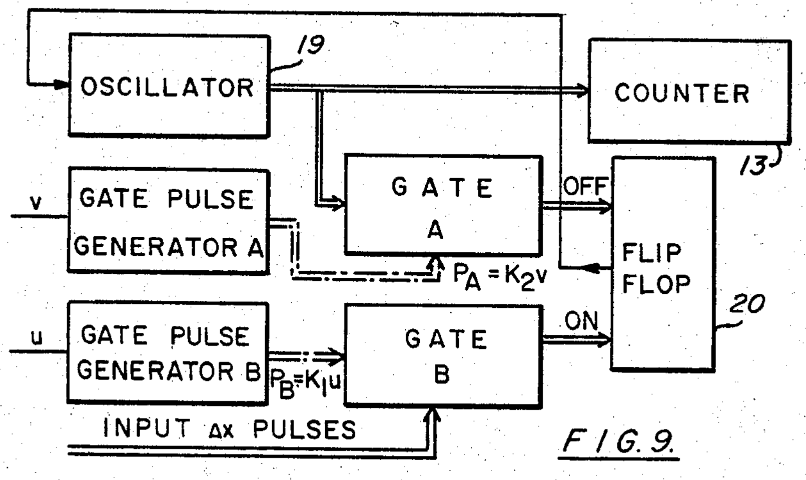
FIGURE 9 is a schematic diagram of a computer according to the invention which is adapted to combine terms in the numerator and the denominator of an integral to be evaluated by the computer.

FIGURE 9 illustrates apparatus for combining terms in both the numerator and denominator, i.e. for evaluating $$\int \frac{u}{v} dx$$

All of the units shown function in the manner hereinbefore described. It is easily shown that the expected value of the number of output pulses is given by $$E(M) = \sum_{j=1}^{n} \frac{P_{B_j}}{P_{A_j}} = \frac{K_1}{K_2} \sum_{j=1}^{n} \frac{u_j}{v_j}$$

where the symbols used are as previously defined. The probabilities $P_A$ and $P_B$ can both be combinations of a number of functions, as described previously. The circuits of FIGURES 8 and 9 can be modified using the principles of FIGURE 2 to accommodate negative $y$ values; however any $y$ values which are close to zero will give inaccurate results.

EXAMPLE

An example of an application of the computer according to FIGURE 9 is illustrated below.

If a gas is flowing in a pipe with a pressure P and an absolute temperate T, then the mass $m$ of the gas flowing through the pipe is $$m = K \int \frac{pv}{T} dt$$

where $v$ is the velocity of the gas. Since $$v = \frac{dx}{dt}$$

where $x$ is the distance travelled, then $$m = K \int \frac{P}{T} dx$$

If a pulse is generated at each turn of a propeller in the pipe, then each pulse represents an incremental distance, $\Delta x$, travelled by the gas. If these pulses are applied to the input of the network of FIGURE 9, and $P_B = K_1.P$ and $P_A = K_2.T$, then the number of output pulses is $$M = \sum_{j=1}^{n} P_{B_j}/P_{A_j} = (K_1/K_2) \sum_{j=1}^{n} P_j/T_j$$

and hence is proportional to the mass of gas flowing past the measuring station.

The systems outlined in block diagram form in this application have not been designed for simplicity or economy of components. The inventive idea was not developed with a limited application in mind and the systems have been chosen for ease of description. Nor has any mention been made of the case where the variable represented by the input pulses does not always increase with time. This case can be handled by a parallel system for negative increments, or by reversing the action of the up-down counter during negative increments. There are several methods of dealing with changes of sign of any of the variables and the one chosen will depend on the particular application. Such methods are known in the art. One method which appears worthy of mention is to represent positive and negative quantities by positive and negative pulses, respectively, at the same terminal. If the individual gates are then designed to operate with these bipolar inputs and to produce outputs with the correct signs, a considerable saving of components could probably be obtained.

Figure 10:
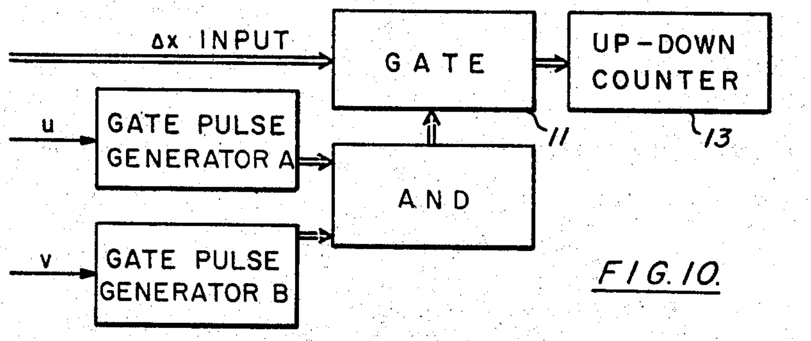
FIGURE 10 is a schematic diagram of a modification of the computer according to FIGURE 5, which uses positive pulses to represent positive values and negative pulses to represent negative values.

FIGURE 10 shows, as an example, the system of FIGURE 5 redrawn using this bipolar system, and extended to include negative increments of the variable $x$. The system works exactly as previously described, except that negative values are represented by negative pulses, and the counter 13 increments its total on receipt of positive pulses, and decrements the total on receipt of negative pulses.

CIRCUIT DESIGN

In the computer according to the invention, the gate pulse generators generate pulses whose dwell times (pulse lengths) are proportional to the magnitude of the input function $y$ in the integral $\int y dx$. The outputs are positive or negative (FIGURE 12), depending on the sign of the input functions. The outputs may be obtained by comparing the input voltage (which is proportional to $y$) with a linear triangular sweep from a sweep generator. FIGURE 11 shows typical waveforms for one such pulse generator.

Figure 11:
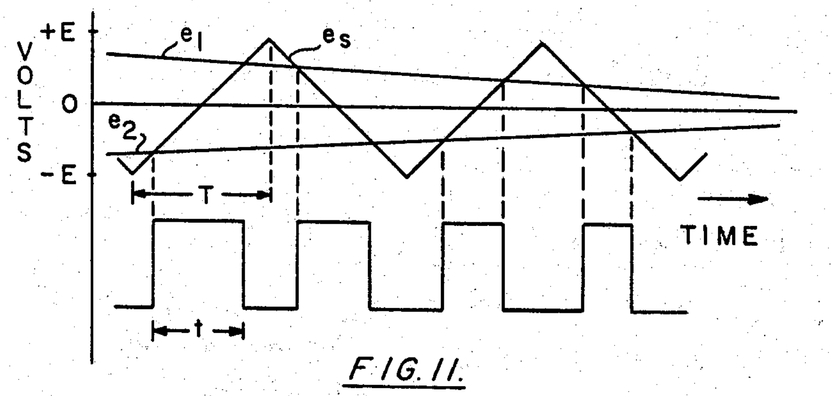
FIGURE 11 is a plot showing the output waveforms and the manner in which they are created, of a gate pulse generator constructed in accordance with the invention.

In FIGURE 11, E designates the limits of the sweep generator voltage, and $e_s$ is the triangular sweep voltage having a half-period T. Voltages $e_1$ and $e_2$ represent the input function $y$ such that $e_1 - e_2 = 2Ey$ and $e_1 + e_2 \approx 0$. These voltages are derived from any suitable analog voltage generator, for example a sine-cosine potentiometer if the computer is evaluating $\int \sin \theta ds$.

Pulses from the positive output are "on" when $$e_1 \geq e_s \geq e_2$$

For $e_1 > e_2$ they will be "on" for a total time $$t = \frac{e_1 - e_2}{2E}$$

T, for each half cycle of the sweep voltage. i.e.

$$\frac{t}{T} = \frac{e_1 - e_2}{2E} = y$$

For $e_1 < e_2$ there will be no pulses from the positive output.

Similarly when $e_1 < e_2$ the pulses from the negative line will be "on" for a proportion of time $t/T = -y$. For $e_1 > e_2$ these pulses will not occur. The circuitry for generating these waveforms is described below.

*Sweep generator*

Figure 12:
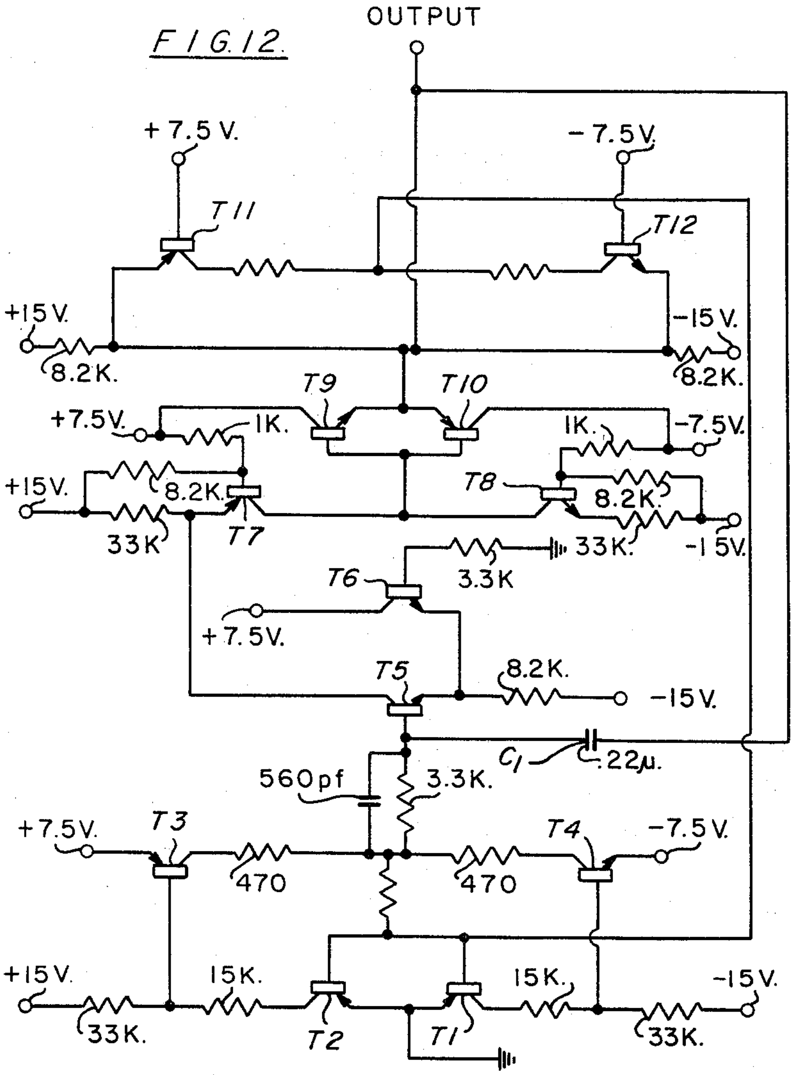
FIGURE 12 is a circuit diagram of a sweep generator which may be used in the computer according to the invention.

A sweep generator which may be used in the computer according to the invention is shown in FIGURE 12. Transistors $T_5$ to $T_{10}$ and the associated circuitry form a high gain amplifier, which with capacitive feedback through the condenser $C_1$, acts as an integrator. The input to the integrator is from the flip-flop formed by transistors $T_1$ to $T_4$ and associated circuitry. With $T_2$ and $T_3$ "on," a positive voltage is applied via the base of the transistor $T_5$ to the integrator. This causes its output to fall at a fixed rate. When the integrator output reaches the base potential −7.5 volts (−E) of the transistor $T_{12}$, the transistor $T_{12}$ conducts and reverses the flip-flop, causing the transistors $T_1$ and $T_4$ to conduct. This results in the application of a negative voltage to the integrator input, causing a positively increasing output. When the output reaches the base potential +7½ volts (+E) of the transistor $T_{11}$, the transistor $T_{11}$ conducts and again reverses the flip-flop. Thus a free-running linear triangular sweep voltage is generated whose excursions are limited to ±7.5 volts. The repetition rate of the generator is approximately 350 c.p.s., if the circuit values shown are used.

*Pulse generator*

Figure 13:
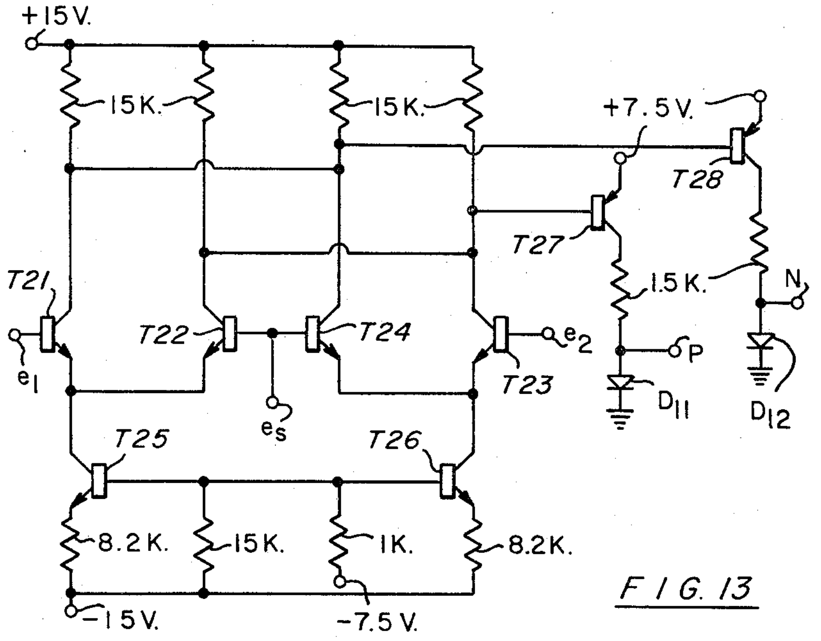
FIGURE 13 is a circuit diagram of a gate pulser generator constructed according to the invention.

A pulse generator circuit which may be used in the computer according to the invention is shown in FIGURE 13. The emitter-emitter coupled transistors $T_{21}$ and $T_{22}$, and $T_{23}$ and $T_{24}$, form voltage coincidence networks. The transistors $T_{25}$ and $T_{26}$ provide constant current at the emitters of the transistors $T_{21}$ to $T_{24}$. The transistor $T_{27}$ is turned off if the transistors $T_{22}$ and $T_{23}$ are both off. This occurs when $e_s > e_2$ and $e_1 > e_s$, i.e., when $e_1 \geq e_s \geq e_2$ ($e_s$ is the output of the sweep generator and $e_1 - e_2 = 2E_y$ as previously discussed). Thus the positive gate pulse is considered "on" when the transistor $T_{27}$ is "off." Similarly the negative gate pulse is "on" when the transistor $T_{28}$ is off. The output of the pulse generator appears at the terminal P for positive pulses, and at the terminal N for negative values of $y$. These terminals are connected to the respective gates for positive and negative values. The diodes $D_{11}$ and $D_{12}$ clamp the output signal to ground level.

*Gate operation*

Figure 14:
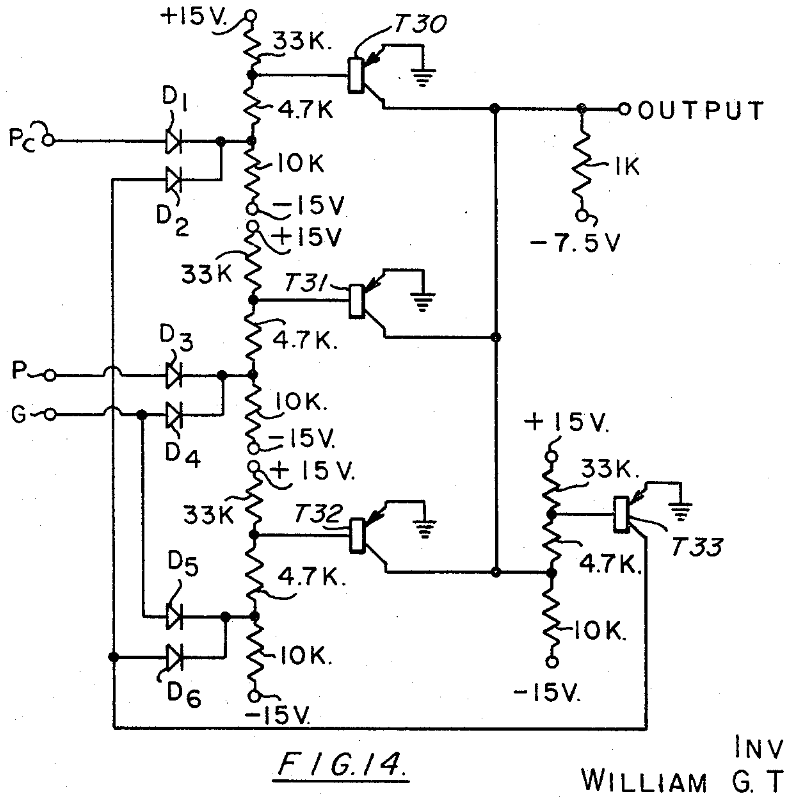
FIGURE 14 is a circuit diagram of a gate circuit constructed according to the invention.

A gate circuit which may be used in the computer according to the present invention is shown in FIGURE 14. The gate uses direct-coupled rather than triggered logic; i.e., there is no capacitive coupling between elements. This method was used because it gives wider latitude to input waveforms and rise times. If it were designed for a specific application where specifications of input waveforms were known, some component saving could probably be achieved if triggered logic were used.

The gate circuit of FIGURE 14 is composed of diode OR gates formed by the diodes $D_1$ to $D_6$ inclusive, and transistor inverters formed by the transistors $T_{30}$, $T_{31}$, $T_{32}$ and $T_{33}$. The gate operation is such that an output is generated only if the gate is "ON" when the input $\Delta x$ pulse arrives. The input $\Delta x$ pulse is applied to terminal P in FIGURE 14; its complement is applied to terminal Pc. The output then remains "ON" until the input pulse disappears. It is evident that the circuit has a bistable (or flip-flop) operation, yet no set of components can be identified as uniquely forming the flip-flop. The logic levels used are: ground potential represents binary 1, negative potential (below $-4$ volts) represents binary 0. The gate pulse input G can be connected directly to the positive or negative output of the gate pulse generator. The input $\Delta x$ pulse and its complement refers to the inverted value of the pulse—i.e., two pulses are required, one of which is at ground level when the input pulse is "on," the other being at ground level when the input pulse is "off" must be produced at the aforementioned logic levels.

The sweep generator, gate pulse generator and gate circuits described with reference to FIGURES 12, 13 and 14 are conventional and merely for purposes of illustration; other circuits may be designed by persons skilled in the art for specific applications. In FIGURES 12, 13 and 14 the PNP transistors are of type 2N317; the NPN transistors of type 2N358.

What I claim as my invention is:

1. A computer for evaluating an integral of the form $\int ydx$, where $x$ and $y$ are variables, comprising a gate pulse generator producing a series of output pulses having a constant frequency of occurrence and whose width corresponds to the absolute value of the variable $y$, and a gate receiving a plurality of input pulses each corresponding to a known uniform finite interval of change of the variable $x$ and receiving the output of the gate pulse generator and passing an input pulse when the leading edge of the input pulse occurs simultaneously with a pulse produced by the gate pulse generator, and a counter receiving the gate output and counting the input pulses passed by the gate.

2. Apparatus as defined in claim 1, wherein the gate pulse generator produces pulses with a frequency of occurrence much greater than the frequency of occurrence of the input pulses.

3. An integrator for evaluating an integral of the form $\int ydx$, where $x$ and $y$ are variables and wherein the variable $x$ continuously increases with respect to time, comprising a gate pulse producing means producing a plurality of gate pulses in such a manner that the probability of occurrence of a gate pulse is proportional to the value of the variable $y$, a gate receiving as a first input a series of pulses each corresponding to a known uniform finite interval of change of the variable $x$ and as a second input the output of the gate pulse producing means and passing any of the pulses corresponding to the variable $x$ only when the leading edge of said last-mentioned pulse coincides with the presence in the gate of gate pulse from the gate pulse producing means, and accumulating means counting the pulses passed by the gate thereby to approximate the value of said integral.

4. Apparatus as defined in claim 3 wherein the first and second variables are statistically independent, and the said interval is sufficiently small that there is no appreciable variation in the integrand over the interval.

5. An integrator comprising a source of analog voltage proportional to the value of a first variable, sweep generating means to producing a triangular output voltage having a maximum amplitude greater than half the maximum value of the analog voltage and having a mean voltage level equal to half the value of the analog voltage, a gate pulse generator receiving said voltages and producing an output pulse during the time that the sweep generator voltage amplitude is less than half the value of the analog voltage, a gate connected to the gate pulse generator and receiving input pulses each of which corresponds to a known uniform finite interval of change of a second variable, the gate passing any of said input pulses only when the leading edge of said last-mentioned pulse coincides with an output pulse of the gate pulse generator, and counting means counting the pulses passed by the gate.

6. Apparatus as defined in claim 5 wherein the first and second variables are statistically independent, and the said interval is sufficiently small that there is no appreciable variation in the integrand over the interval.

7. An integrator comprising a first gate and a second gate, a source of input pulses each corresponding to a known uniform finite interval of change of a first variable, the gates receiving the input pulses and passing the pulses randomly but with a probability proportional to the value of a second variable, the first gate passing the input pulses only when the second variable has a positive value, the second gate passing the input pulses only when the second variable has a negative value, and an accumulator connected to the gates and increasing its total count by one unit upon receiving a pulse passed by the first gate and decreasing its total count by one unit upon receiving a pulse passed by the second gate.

8. An integrator for evaluating an integral of the form $\int u \cdot vdx$, where $u$, $v$, and $x$ are variables, comprising a first gate pulse generator and a second gate pulse generator, an AND gate receiving the outputs of the two gate pulse generators and passing the output pulses of the two gate pulse generators only when the pulses are simultaneously present, a second gate responsive to the AND gate and receiving as an input a source of input pulses each corresponding to a known uniform finite interval of change of the variable $x$ and passing said input pulses only when the leading edge of said input pulses coincides with an output from the AND gate, the first gate pulse generator producing a series of pulses having a constant frequency of occurrence and whose width is proportional to the value of the variable $u$, the second gate pulse generator producing a series of pulses having a constant frequency of occurrence and whose width is proportional to the value of the variable $v$, and a counter counting the pulses passed by the second gate.

9. An integrator for evaluating an integral of the form $\int u \cdot vdx$, where $u$, $v$, and $x$ are variables, comprising a first gate pulse generator producing a first series of pulses if the value of the variable $u$ is positive and a second series of pulses if the value of the variable $u$ is negative, the width of said pulses corresponding to the absolute magnitude of the variable $u$, a second gate pulse generator producing a third series of pulses if the value of the variable $v$ is positive and producing a fourth series of pulses if the value of the variable $v$ is negative, each pulse of said third and fourth series of pulses having a width which is proportional to the absolute magnitude of the value of the variable $v$, the frequency of occurrence of said pulses being constant while the pulses are being produced, a first gate producing a fifth series of pulses of said constant frequency of occurrence and whose pulse width is the sum of the product of the first pulse width and the third pulse width and the product of the second pulse width and the fourth pulse width, a second gate producing a sixth series of pulses having said constant frequency of occurrence and whose pulse width is the sum of the product of the first pulse width and the fourth pulse width plus the product of the second pulse width and the third pulse width, a third gate and a fourth gate responsive to the first and second gates respectively, said third and fourth gates each receiving as an input a series of input pulses each corresponding to a known uniform finite interval of change of the variable $x$, the third gate passing an input pulse if a pulse produced by the first gate is present simultaneously with the leading edge of said last-mentioned input pulse, and the fourth gate passing an input pulse if a pulse produced by the second gate is present simultaneously with the leading edge of said last-mentioned input pulse, and a counter receiving the output of the third and fourth gates and increasing its total by one unit upon receiving a pulse passed by the third gate and decreasing its total by one unit upon receiving a pulse passed by the fourth gate.

10. An integrator for evaluating an integral of the form $\int(u+v)dx$ where $u$, $v$ and $x$ are variables, comprising a first and a second gate pulse generator each producing a series of gate pulses of constant frequency of occurrence and whose width corresponds to the value of the variable $u$ and the variable $v$ respectively, a first AND gate receiving the output of the first gate pulse generator, a second AND gate receiving the output of the second gate pulse generator, an oscillator opening the first AND gate alternately with the second AND gate so that one and only one of said AND gates is open at any time, the first AND gate producing an output pulse only when the first AND gate is open simultaneously with a pulse produced by the first gate pulse generator, the second AND gate producing an output pulse only when the second AND gate is open simultaneously with a pulse produced by the second gate pulse generator, an OR gate passing the outputs of both said AND gates, an input gate receiving a source of input pulses each corresponding to a known uniform finite interval of change of the variable $x$ and passing an input pulse when the leading edge of said last-mentioned input pulse coincides with the presence of an output from the OR gate, and a counter counting the pulses passed by the input gate.

11. An integrator for evaluating an integral of the form $$\int\frac{1}{y}dx$$

where $x$ and $y$ are variables, comprising a gate pulse generator producing a series of output pulses of constant frequency of occurrence whose width corresponds to the magnitude of the variable $y$, a gate receiving the output of the gate pulse generator, a flip flop unit connected to the gate and turned on by any of a series of input pulses each of which corresponds to a known uniform finite interval of change of the variable $x$ and turned off when the gate passes an output pulse, an oscillator connected to the flip flop unit and turned on when the flip flop unit is on and to be turned off when the flip flop unit is off, the oscillator producing a series of output pulses, the gate passing any one of the last-mentioned series of pulses when the leading edge of said any one pulse coincides with a pulse produced by the gate pulse generator, and a counter counting the output pulses of the oscillator.

12. An integrator for evaluating an integral of the form $$\int\frac{K_1u}{K_2v}dx$$

where $u$, $v$ and $x$ are variables and $K_1$ and $K_2$ are constants, comprising a first and a second gate pulse generator each producing a series of gate pulses having a constant frequency of occurrence and whose widths correspond to the magnitude of the variable $u$ and the variable $v$ respectively, a first gate and a second gate receiving the output of the first and second gate pulse generator respectively, the second gate passing any one of a series of input pulses each corresponding to a known uniform finite interval of change of the variable $x$ when the leading edge of said any one pulse coincides with any one of said second gate pulses, a flip flop unit responsive to the gates and switched to a first stable state by a pulse passed by the first gate and switched to a second stable state by an input pulse passed by the second gate, an oscillator controlled by the flip flop unit and producing a series of output pulses of constant frequency of occurrence only when the flip flop unit is in the second stable state, the first gate passing an oscillator pulse when the leading edge of said oscillator pulse coincides with a pulse produced by the first gate pulse generator, and an accumulator counting the output pulses of the oscillator.

13. An integrator for evaluating an integral of the form $\int u.vdx$, where $u$, $v$ and $x$ are variables, comprising a first and a second gate pulse generator each producing a series of output pulses having a constant frequency of occurrence and whose widths correspond to the absolute value of the variable $u$ and the variable $v$ respectively, each of the output pulses being of one polarity for positive values of the associated variable and being of opposite polarity when the associated variable has a negative value, an AND gate passing pulses having said constant frequency of occurrence and each having a width corresponding to the product of the widths of simultaneous output pulses of the two generators, an input gate receiving a series of input pulses each corresponding to a known uniform finite interval of change of the variable $x$ and having a polarity corresponding to the direction of change of the variable $x$, the input gate passing any one of said input pulses when the leading edge of said any one input pulse coincides with a pulse passed by the AND gate thereby to produce output pulses which are of a first polarity when the AND gate output and the said any one input pulse are of the same polarity, and which are of a second polarity when the input and AND gate pulses are of opposite polarity, and a counter receiving the output of the input gate and increasing its total by one unit when the received pulse is of the first polarity, and decreasing its total by one unit when the received pulse is of the second polarity.

14. In or for use with computing apparatus, the combination of means to producing an analog of known uniform finite increments of a first variable, means producing an analog of the value of a second variable, and means receiving both said analogs and producing a random output which is proportional to the frequency of occurrence of the said increments and is proportional to a probability which is proportional to the value of the second variable.

15. A combination as defined in claim 14, additionally including means receiving and sensing the random output and translating the output into determinable information.

16. Apparatus as defined in claim 15 wherein the first and second variables are statistically independent.

17. An integrator for evaluating an integral of the form $\int ydx$, where $x$ and $y$ are variables, comprising a first gate and a second gate, a gate pulse generator producing a series of gate pulses whose pulse length corresponds to the absolute value of the variable $y$, a source of input pulses corresponding to known uniform finite intervals of change of the variable $x$, the two gates receiving the input pulses and the gate pulses and passing an input pulse only if the leading edge of the last-mentioned pulse is received simultaneously with a gate pulse, the first gate passing the input pulses only when the variable $y$ has a positive value, the second gate passing the input pulses only when the variable $y$ has a negative value, and an accumulator receiving the output of the two gates and increasing its total by one unit upon receiving a pulse passed by the first gate and decreasing its total by one unit upon receiving a pulse passed by the second gate.

18. An integrator for evaluating an integral of the form $$\int \frac{1}{y} dx$$

where $x$ and $y$ are variables, comprising a flip flop unit receiving as an input a series of input pulses each corresponding to a known uniform finite interval of change of the variable $x$ and switched to a stable state when any one of said input pulses is received, an oscillator responsive to the flip-flop unit and producing a series of output pulses of constant frequency of occurrence only when the flip-flop unit is in said stable state, a gate pulse generator producing a series of gate pulses of constant frequency of occurrence and having a width proportional to the absolute value of the variable $y$, a gate responsive to the oscillator and to the gate pulse generator and passing any of the pulses produced by the oscillator when the leading edge of said last-mentioned pulse coincides with a gate pulse, the flip flop unit being responsive to the gate and switched out of said stable state upon receiving a pulse from the oscillator passed by the gate.

19. An integrator for evaluating integrals of the form $\int y dx$ where $x$ and $y$ are variables, comprising gating means receiving a series of input electric pulses each of which corresponds to a predetermined uniform finite interval of change of the variable $x$ and passing said input pulses randomly but with a probability of passage proportional to the absolute magnitude of the value of the variable $y$, and means sensing the output of said gating means and translating said output into determinable information.

20. Apparatus as defined in claim 19, wherein the variable $x$ and $y$ are statistically independent.

21. Apparatus as defined in claim 20, wherein the variables $x$ and $y$ are statistically independent.

22. Apparatus as defined in claim 21, wherein the said interval is too small for any appreciable variation in the value of the variable $y$ during any one interval.

References Cited

UNITED STATES PATENTS

| | | | |
|---|---|---|---|
| 2,995,304 | 8/1961 | Regue | 235—194 |
| 3,014,659 | 12/1961 | Dickinson | 235—150.51 |
| 3,043,516 | 7/1962 | Abbott et al. | 235—193 |
| 3,103,578 | 9/1963 | Dietrich | 235—150.51 |
| 3,264,457 | 8/1966 | Seegmiller et al. | 235—194 |
| 3,264,459 | 8/1966 | Ericson | 235—183 |

MALCOLM A. MORRISON, *Primary Examiner.*
J. F. RUGGIERO, *Assistant Examiner.*